United States Statutory Invention Registration [19]

[11] Reg. Number: H907

Tate et al.

[43] Published: Apr. 2, 1991

[54] PROCESS FOR PRODUCING CONDUCTIVE GRAPHITE FIBER

[75] Inventors: Kazuhito Tate, Kanagawa; Koji Tsuchimoto, Chiba; Kazuhiro Yanagida, Kanagawa, all of Japan

[73] Assignee: Mitsubishi Oil Co., Ltd., Tokyo, Japan

[21] Appl. No.: 207,482

[22] Filed: Jun. 16, 1988

[30] Foreign Application Priority Data

Jun. 19, 1987 [JP] Japan ..... 62-151237

[51] Int. Cl.[5] ..... C01B 31/04

[52] U.S. Cl. ..... 423/448; 423/447.2; 264/29.2

[58] Field of Search ..... 423/447, 447.2, 447.4, 423/447.6, 448; 208/39, 44; 264/29.2

[56] References Cited

U.S. PATENT DOCUMENTS

| | | | |
|---|---|---|---|
| 2,915,370 | 12/1959 | Mitchell | 423/448 |
| 3,718,574 | 2/1973 | Araki et al. | 423/447.4 |
| 3,919,387 | 11/1975 | Singer | 264/29.2 |
| 4,005,183 | 1/1977 | Singer et al. | 423/447.1 |
| 4,011,293 | 3/1977 | Gale | 423/447.1 |
| 4,016,247 | 4/1977 | Otari et al. | 423/447.4 |
| 4,369,171 | 1/1983 | Grindstaff et al. | 423/448 |
| 4,402,928 | 9/1983 | Lewis et al. | 423/447.1 |
| 4,454,020 | 6/1984 | Izumi et al. | 423/447.2 |
| 4,528,087 | 7/1985 | Shibatani et al. | 423/447.2 |
| 4,670,129 | 6/1987 | Tate et al. | 208/39 |
| 4,793,912 | 12/1988 | Tate et al. | 423/447.4 |
| 4,801,372 | 1/1989 | Tate et al. | 423/447.4 |

FOREIGN PATENT DOCUMENTS

| | | | |
|---|---|---|---|
| 62-43461 | 2/1987 | Japan | 423/447.1 |
| 62-156124 | 7/1987 | Japan | 423/448 |

*Primary Examiner*—Brooks H. Hunt
*Assistant Examiner*—Joseph D. Anthony
*Attorney, Agent, or Firm*—Sughrue, Mion, Zinn, Macpeak & Seas

[57] ABSTRACT

A process for producing a graphite fiber is disclosed, which is characterized by using, as a starting material, an optically anisotropic pitch prepared from a compound having a specific chemical structure as represented by formula (I) shown in the specification. The resulting graphite fiber shows a highly developed graphite structure and has excellent electrical conductivity.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR PRODUCING CONDUCTIVE GRAPHITE FIBER

FIELD OF THE INVENTION

This invention relates to a process for producing a graphite fiber having a highly developed graphite structure and exhibiting excellent electrical conductivity. More particularly, it relates to a process for producing a graphite fiber useful in composite materials and the like, taking full advantage of not only mechanical characteristics, but also electrical conductivity, thermal conductivity, and heat resistance.

BACKGROUND OF THE INVENTION

Carbon fibers produced from polyacrylonitrile (PAN), a pitch, etc., have hitherto been used chiefly for their mechanical characteristics, but have recently been reappraised as high performance material. For example, application of carbon fibers as electromagnetic shielding or as synthetic electric wires utilizing a graphite interlaminar compound has been studied.

Upon consideration of the application of such carbon fibers as high performance material, a PAN carbon fiber, included under the category of sparingly graphitizable carbon, achieves poor development of a graphite structure even when subjected to high temperature treatment. Carbon fibers produced from a mesophase pitch are regarded as superior in graphitizing properties to those of the PAN carbon fiber, but are still unsatisfactory as compared with graphite, since the mesophase pitch is obtained from coal tar or residual oil and is not uniform in the structure of its constituting compounds. For example, Japanese Patent Publication No. 4287/85 teaches that a graphitized fiber having an electrical resistivity of from $150\times10^{-6}$ to $200\times10^{-6}$ Ωcm can be obtained by heat treatment of a carbon fiber prepared from a mesophase pitch at 3000° C. This result is inferior to that of a graphite fiber prepared from a carbon fiber grown in a vapor phase, i.e., $65\times10^{-6}$ Ωcm, which is believed attributable to the non-uniform structure of the compounds constituting the mesophase pitch used as a starting material.

On the other hand, the carbon fibers grown in a vapor phase which are now attracting attention as fibrous graphite show satisfactory development of a graphite structure as described above and are expected to be applied as functional material. Nevertheless, they are produced as having a fiber length of only several centimeters and, therefore, have their own limit of application. Moreover, their production yield is low.

SUMMARY OF THE INVENTION

Accordingly, one object of this invention is to provide a process for producing a graphite fiber having excellent electrical conductivity because of its highly developed graphite structure.

As a result of extensive investigations, it has now been found that a carbon fiber which has a specifically developed graphite structure and is thereby excellent in electrical conductivity can be obtained by starting with a mesophase pitch prepared from a chemically synthesized compound having a specific chemical structure in which alkylbenzene moieties are linked via a methylene linkage.

The present invention relates to a process for producing a graphite fiber which comprises melt-spinning an optically anisotropic pitch, making the resulting fiber infusible, carbonizing the infusible fiber, and graphitizing the carbonized fiber at a temperature of from 2500° C. to 3300° C., wherein said optically anisotropic pitch is prepared by heat treating a compound represented by formula (I):

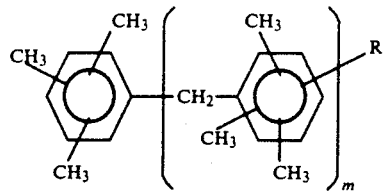

wherein R represents a hydrogen atom or a methyl group; and m represents an integer of 1 or more.

The present invention is characterized by the use of a pitch having a toluene soluble content as a main component and a low softening point in spite of its high optical anisotropy as a starting material, said pitch being prepared from a low-molecular weight compound which has been rarely utilized as a raw material for pitches.

DETAILED DESCRIPTION OF THE INVENTION

The terminology "optical anisotropy" as used herein means such a property of a pitch that brightness is observed when a cross section of a pitch clump solidified at around room temperature is polished and examined under crossed Nicols of a reflection type polarizing microscope. Optical anisotropy can be quantitatively expressed in terms of a percentage of an area of the phase exhibiting optical anisotropy based on the total phase area.

The terminology "toluene insoluble content" as used herein means that determined according to the method specified in JIS K-2425.

The terminology "softening point" as used herein means a temperature at which a pitch powder under heating at a rate of 10° C./min in a nitrogen atmosphere is found to begin to deform under observation by a hot stage type microscope.

In order to obtain a graphite fiber having a highly developed structure according to the present invention, it is necessary to start with a raw material having a specific chemical structure and to process the raw material under sufficiently controlled conditions. To this effect, the process of the present invention starts with a compound in which alkylbenzene moieties are linked via a methylene linkage as represented by formula (I). Such an alkylbenzene as a starting material for such a compound includes a trimethylbenzene or a fraction containing a trimethylbenzene as a main component. As a raw material of present invention, it is unsuitable to use a compound having a side chain of longer than methyl group. Among these methylbenzenes, a trimethylbenzene forms a pitch exhibiting excellent graphitization. Also, when in using 1,2,4-trimethylbenzene or 1,3,5-trimethylbenzene in the form of a single compound as a raw material for a pitch, the resulting fiber undergoes specific development of a graphite structure to become a graphite fiber exhibiting excellent electrical conductivity. As a fraction containing a trimethylbenzene as a main component, there is an alkylbenzene fraction having 9 carbon atoms that is obtained in large quantity and at low cost by catalytic reforming in the petroleum industry. These compounds are very excellent raw materials because they essentially contain neither free carbon nor inorganic materials, such as a catalyst powder, etc., differing from a coal tar pitch containing fine ash particles or a catalytic cracking residue. Further, these raw materials had been subjected to a strict pretreatment in the petroleum industry so as to exclude most of the hetero atoms, e.g., sulfur. Accordingly, they exhibit well-developed anisotropy and are liable to develop a graphite structure when used as a raw material for a graphite fiber.

The process for the production of these raw materials is not restricted as long as the compound having the formula (I) can be obtained. For example, the compound of formula (I) can be prepared by polymerizing trimethylbenzene and formaldehyde in the presence of a protonic acid as a catalyst or by reacting trimethylbenzene and dichloromethane in the presence of aluminium chloride ($AlCl_3$) as a catalyst.

Of these compounds represented by formula (I), the compound in which at least two alkylbenzenes ($m=1$) are bonded together is used for the present invention, moreover, the compound in which at least three alkylbenzenes are bonded together is preferred because of its high yield when making a pitch.

In the case of polymerizing a trimethylbenzene and formaldehyde using sulfuric acid as a catalyst, the resulting polymer sometimes has a high oxygen content depending on the reaction conditions. The compound of this type is not only apt to decompose upon thermal reforming, resulting in reduced yield of a pitch, but also shows defective development of a graphite structure. Therefore, it is important to adjust the oxygen content in the polymerization product to 5% by weight or less, and preferably 2% by weight or less.

The thus obtained compound is subjected to heat treatment in a usual manner to form a mesophase pitch. The heat treatment can be carried out, for example, by thermal reforming at 380° C. to 440° C. and at atmospheric pressure for 0.5 to 20 hours; or by thermal reforming at 440° C. to 500° C. under a pressure of from 3 to 30 kg/cm$^2$ for 0.5 to 20 hours, follows by removal of more volatile components at 380° C. to 410° C. under reduced pressure of 20 mmHg or less. More volatile components may be removed by blowing an inert gas at atmospheric pressure.

The mesophase pitch is then melt-spun at 260° to 310° C. according to a known method. The resulting fiber is made infusible by heating in air at a heating rate of 0.1 to 5° C./min up to 300° C. and, thereafter, carbonized by heating in an inert gas atmosphere at a heating rate of from 0.5° to 100° C./min up to a temperature of from 1000° to 2000° C. Then, the carbonized fiber is heated at 2500° to 3300° C. for 1 to 20 minutes to effect graphitization.

In order to obtain graphite fibers having satisfactory conductivity, it is essentially required to orient molecules along the direction of fiber axis in the stage of spinning. Therefore, it is desirable that the pitch to be spun should have a large proportion of an anisotropic phase. In addition, as is easily anticipated, the oriented molecules of the fiber advantageously have a longer structure in the direction of the fiber axis.

In cases where a polymerization product is obtained starting with trimethylbenzene, the resulting polymer mainly comprises a compound having a plurality of benzene rings linked via a methylene linkage. The inventors have confirmed that the benzene rings adjacent to each other are cyclized together via the alkyl side chain upon heat treatment to thereby form a condensed ring structure in a relatively large proportion. The present invention is further characterized in that the alkyl substituent is maintained to some extent during the heat treatment. Such a specific molecular structure makes it possible to produce a pitch having a low softening point and a high proportion of an anisotropic phase, namely, high anisotropy. Hence, the pitch according to the present invention can easily achieve development of a graphite structure on graphitization to have high electrical conductivity.

In more detail, it is preferable for production of fibers particularly excellent in graphitizing property that the raw material therefor should have a regular molecular structure. To our surprise, a $C_9$ fraction in the middle between a xylene fraction and $C_{10}$ fraction of a reformate is superior in graphitizing property to either of the xylene and $C_{10}$ fractions. In particular, when 1,2,4-trimethylbenzene or 1,3,5-trimethylbenzene is used alone as a starting compound, the finally obtained graphite fiber achieves a specific development of a graphite structure to show excellent conductivity. However, a fiber made of methylethylbenzene as a starting compound is not superior in graphitizing property as compared with a fiber made of trimethylbenzene which is also a $C_9$ aromatic fraction. In addition, when dimethylethylbenzene which is one of tri-substituted benzenes is used, a good result is not obtained.

In order to obtain a graphite fiber from a pitch prepared from these compounds as a raw material, it is essentially required to orient the molecules of the pitch along the fiber axis direction, and it is desirable that the pitch contains an anisotropic phase in a proportion as high as possible. Specifically, the pitch preferably has an optical anisotropy of at least 95%, and more preferably 100%.

The pitch of the present invention has a softening point between 180° C. and 250° C., even when it has an optical anisotropy of 100%, so that it can be spun stably at a spinning temperature of 310° C. or lower. A particularly preferred softening point of the pitch ranges from 210° to 250° C. Fibers spun from the pitch having a softening point between 210° C. and 250° C. can be made infusible in air without using any special oxidizing agent, such as ozone, namely, with economy. In order to accomplish a further developed anisotropic phase and to further lower the softening point, the pitch preferably has a hydrogen/carbon ratio (hereinafter referred to as H/C ratio) ranging from 0.75 to 0.85.

It is preferable for achieving development of a graphite structure that the pitch should have a small toluene insoluble content, and preferably not more than 50% by weight of a toluene insoluble content, while showing optical anisotropy. In other words, the pitch of the present invention is an anisotropic and toluene soluble pitch.

It is not until a pitch having the above-described specific characteristics is used as a starting material that graphite fibers having a highly developed graphite structure and excellent electrical conductivity can be obtained.

The graphite fiber produced in accordance with the present invention preferably has an interlaminar distance ($d_{002}$) of 3,370 or less as determined by X-ray diffractometry and a specific resistivity of from 60 to 200 Ωcm, because they well develop the three dimensional order characteristic of polycrystalline graphite and graphite like properties.

The present invention is now illustrated in greater detail with reference to Examples and Comparative Examples, but it should be understood that the present invention is not construed to be limited thereto. In these examples, all the percents except for those of optical anisotropy are by weight unless otherwise indicated. All parts, ratios and the like are also by weight unless otherwise specified.

EXAMPLE 1

In a flask equipped with stirring blades and a reflex condenser were charged 400 g of 1,2,4-trimethylbenzene, 48 g of p-formaldehyde, and 120 g of 75% sulfuric acid, and the mixture was allowed to react at 100° C. for 4 hours. After completion of the reaction, 400 g of toluene was added to the reaction mixture, and the thus diluted reaction mixture was washed with pure water until the aqueous layer became neutral. Thereafter, any unreacted material was removed by distillation under reduced pressure at 120° C./10 mmHg to obtain 220 g of a polymer. The polymer was found to have an oxygen content of 0.2%.

Then, 100 g of the polymer was allowed to further react at 410° C. for 5 hours in a nitrogen gas atmosphere while refluxing, followed by distillation under reduced pressure at 400° C./15 mmHg to remove more volatile contents to thereby obtain 11 g of a mesophase pitch. The resulting pitch was found to have an optical anisotropy of 100%, a softening point of 225° C., an H/C ratio of 0.797, and a toluene insoluble content of 40.8%.

When the pitch was melt-spun by the use of a spinning nozzle of 0.5 mm in diameter at a spinning temperature of 280° C., spinning could be effected smoothly without breaking at a pitch fiber diameter of 15 μm. The pitch fiber (stock fiber) was made infusible by heating in air while gradually elevating the heating temperature ultimately up to 300° C. and then carbonized in an inert gas atmosphere, elevating the temperature up to 1000° C. The resulting carbonized fiber was further heated at 2500° C. or 3000° C. to effect graphitization.

The yield, fineness, tensile strength, modulus of elasticity, interlaminar distance ($d_{002}$), and specific resistivity of the resulting graphite fiber were determined, and the results obtained are shown in Table 1.

EXAMPLE 2

A polymer was produced in the same manner as described in Example 1, except for using 1,3,5-trimethylbenzene in place of 1,2,4-trimethylbenzene. The resulting polymer had an oxygen content of 0.4%.

The polymer was processed into a mesophase pitch in the same manner as in Example 1. The resulting pitch was found to have an optical anisotropy of 100%, a softening point of 225° C., an H/C ratio of 0.783, and a toluene insoluble content of 38.5%.

The resulting pitch was melt-spun at 280° C., made infusible, carbonized at 1000° C., and graphitized at 2500° C. or 3000° C. under the same conditions as in Example 1 to produce a graphite fiber. The properties of the graphite fiber are shown in Table 1.

EXAMPLE 3

In a flask equipped with stirring blades and a reflux condenser were charged 270 g of a $C_9$ aromatic fraction (a fraction of heavy reformed oil having a boiling point of from 160° to 180° C.) whose composition was shown below, 30 g of trioxane, and 50 g of a cation exchange resin, and the mixture was reacted at 78° to 84° C. for 4 hours. After completion of the reaction, the catalyst was separated by filtration and washed with 100 g of toluene. The toluene washing and the reaction mixture (filtrate) were combined and washed with pure water until the aqueous layer became neutral. Any unreacted material was removed by distillation under reduced pressure at 20° C./10 mmHg to obtain 120 g of a polymer having an oxygen content of 0.2%.

| Composition of $C_9$ Aromatic Fraction | |
|---|---|
| $C_8$ Aromatics | 0.9 wt % |
| $C_9$ Aromatics | |
| Propylbenzenes | 6.4 wt % |
| Methylethylbenzenes | 36.6 wt % |
| 1,2,4-Trimethylbenzene | 31.3 wt % |
| 1,3,5-Trimethylbenzene | 11.4 wt % |
| 1,2,3-Trimethylbenzene | 5.3 wt % |
| Indane | 1.7 wt % |
| ($C_9$ aromatics total) | (92.7 wt %) |
| $C_{10}$ Aromatics | 6.4 wt % |
| Total | 100.0 wt % |

Sixty grams of the polymer was allowed to react at 410° C. in a nitrogen atmosphere for 5 hours while refluxing, an more volatile contents were removed therefrom by distillation under reduced pressure at 400° C./15 mmHg to obtain 7.8 g of a mesophase pitch. The resulting pitch was found to have an optical anisotropy of 100%, a softening point of 240° C., an H/C ratio of 0.780, and a toluene insoluble content of 36.4%.

When the pitch was melt-spun by means of a spinning nozzle having a diameter of 0.5 mm at a spinning temperature of 295° C., spinning could be carried on without fiber break at a pitch fiber diameter of 15 μm. The pitch fiber (stock fiber) was made infusible by heating in air at a gradually elevating temperature up to 300° C. and then carbonized in an inert gas atmosphere at a temperature elevating up to 1000° C. The resulting carbonized fiber was further heated at 2500° C. or 3000° C. to effect graphitization. The results obtained are shown in Table 1.

COMPARATIVE EXAMPLE 1

In a flask equipped with stirring blades and a reflux condenser were charged 550 g of xylene, 100 g of p-formaldehyde, and 200 g of 83% sulfuric acid, and the mixture was allowed to react at 110° C. for 5 hours. After completion of the reaction, 500 g of toluene was added to the reaction mixture. The mixture was washed with pure water until the aqueous layer became neutral. Any unreacted material was removed by distillation under reduced pressure at 120° C./10 mmHg to obtain 300 g of a polymer The polymer was found to have an oxygen content of 0.1%.

Sixty grams of the polymer was refluxed in an inert atmosphere at 420° C. for 7 hours and then distilled under reduced pressure at 400° C./10 mmHg to remove more volatile contents to obtain 25. g of a mesophase pitch. The pitch had an optical anisotropy of 100%, a softening point of 225° C., an H/C ratio of 0.670, and a toluene insoluble content of 38.2%.

When the pitch was melt-spun by the use of a spinning nozzle having a diameter of 0.5 mm at a spinning temperature of 270° C., spinning could be carried on smoothly without fiber break at a pitch fiber diameter of 15 μm. The resulting pitch fiber (stock fiber) was made infusible by heating in air at a gradually elevating temperature up to 300° C. and then carbonized in an inert gas atmosphere at a temperature elevating up to 1000° C. The resulting carbonized fiber was further heat-treated at 2500° C. or 3000° C. to effect graphitization. The results obtained are shown in Table 1.

COMPARATIVE EXAMPLE 2

In a flask equipped with stirring blades and a reflux condenser were charged 300 g of a $C_{10}$ aromatic fraction (a fraction of a heavy reformed oil having a boiling point of from 180° C. to 200° C.) whose composition was shown below, 30 g of trioxane, and 50 g of a cation exchange resin, and the mixture was allowed to react under the same conditions as in Example 3 to obtain 130 g of a polymer. The polymer was found to have an oxygen content of 0.4%.

| Composition of $C_{10}$ Aromatic Fraction | |
|---|---|
| $C_9$ Aromatics | 1.2 wt % |
| $C_{10}$ Aromatics | |
| Methylpropylbenzenes | 10.9 wt % |
| Diethylbenzenes | 1.5 wt % |
| Dimethylethylbenzenes | 40.1 wt % |
| Tetramethylbenzenes | 28.7 wt % |
| Methylindane | 2.5 wt % |
| Butylbenzene | 1.4 wt % |
| Naphthalene | 6.4 wt % |
| ($C_{10}$ aromatics total) | (91.5 wt %) |
| $C_{11}$ Heaviers | 7.3 wt % |
| Total | 100.0 wt % |

Sixty grams of the polymer was refluxed in an inert atmosphere at 400° C. for 4 hours. Thereafter, a tube for introducing nitrogen was inserted into the reaction mixture, and nitrogen was introduced thereinto at a rate of 400 cc/min at 410° C. to remove more volatile contents to thereby obtain 6.2 g of a pitch. The resulting pitch was found to have an optical anisotropy of 90%, a softening point of 230° C., an H/C ratio of 0.80, and a toluene insoluble content of 35.0%.

When the pitch was melt-spun by the use of a spinning nozzle having a diameter of 0.5 mm at a temperature of 280° C., spinning could be carried on without fiber break at a pitch fiber diameter of 15 μm. The pitch fiber was made infusible by heating in air at a temperature elevating up to 300° C. and then carbonized in an inert atmosphere at a temperature elevating up to 1000° C. The resulting carbonized fiber was further heat-treated at 2500° C. or 3000° C. to effect graphitization. The results obtained are shown in Table 1. As is apparent from Table 1, the graphitization is bad, and hence, the interlaminar distance is large and the specific resistivity is not so small.

COMPARATIVE EXAMPLE 3

A pitch was produced in the same manner as in Example 1, except for using, as a raw material, a heavy oil (whose composition was shown below) having a boiling point of 400° C. or higher which was a residue from fluid catalytic cracking oil. The resulting pitch was found to have an optical anisotropy of 90%, a softening point of 280° C., and an H/C ratio of 0.58.

| Composition of Heavy Oil (by Silica gel-Alumina gel column chromatography) | |
|---|---|
| Saturate | 9.0 wt % |
| 1 ring aromatics | 2.4 wt % |
| 2 rings aromatics | 2.6 wt % |
| 3 rings aromatics | 59.4 wt % |
| Polycyclic aromatics and Resins | 12.7 wt % |
| $nC_5$ insolubles | 13.9 wt % |
| Total | 100.0 wt % |

When the pitch was melt-spun by the use of a spinning nozzle having a diameter of 0.5 mm at 350° C., spinning could be carried on without fiber break at a pitch fiber diameter of 13 μm. The pitch fiber was made infusible by heating, in air at a temperature elevating up to 300° C. and then carbonized in an inert atmosphere at a temperature elevating up to 1000° C. The resulting carbonized fiber was further heat-treated at 2500° C. or 3000° C. to effect graphitization. The results obtained are shown in Table 1. As is apparent from Table 1, the graphitization is bad, and hence, the interlaminar distance is large and the specific resistivity is not so small.

TABLE 1

| | | | | | Graphitization at 2500° | | Graphitization at 3000° C. | |
|---|---|---|---|---|---|---|---|---|
| Example No. | Yield* (wt %) | Fineness (μm) | Tensile Strength (T/cm²) | Modulus of Elasticity (T/cm²) | Interlaminar Distance ($d_{002}$) (Å) | Specific Resistivity (μΩcm) | Interlaminar Distance ($d_{002}$) (Å) | Specific Resistivity (μΩcm) |
| Example 1 | 82 | 8.4 | 36 | 8800 | 3.378 | 333 | 3.359 | 75 |
| Example 2 | 83 | 8.8 | 37 | 8500 | 3.380 | 350 | 3.359 | 80 |
| Example 3 | 82 | 9.0 | 36 | 8200 | 3.381 | 412 | 3.364 | 140 |
| Comparative Example 1 | 85 | 9.8 | 34 | 6500 | 3.392 | 474 | 3.372 | 220 |
| Comparative Example 2 | 81 | 10.0 | 36 | 5900 | 3.400 | 636 | 3.380 | 340 |
| Comparative Example 3 | 87 | 8.4 | 34 | 6400 | 3.393 | 476 | 3.372 | 240 |

Note:
*Based on the stock fiber

As described above, the present invention provides a process for producing a graphite fiber excellent in conductivity by using a compound having a specific chemical structure as a raw material.

The graphite fiber obtained according to the present invention has a highly developed graphite structure and is, therefore, markedly superior to the conventional products in electrical conductivity and modulus of elasticity.

While the invention has been described in detail and with reference to specific embodiments thereof, it will be apparent to one skilled in the art that various changes and modifications can be made therein without departing from the spirit and scope thereof.

What is claimed is:

1. A process for producing a graphite fiber which comprises melt-spinning an optically anisotropic pitch, making the resulting fiber infusible, carbonizing the infusible fiber, and graphitizing the carbonized fiber at a temperature of from 2500° to 3000° C., wherein said optically anisotropic pitch is prepared by heat treating a compound represented by formula (I):

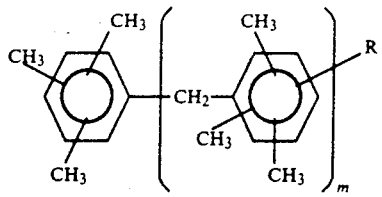

wherein R represents a hydrogen atom or a methyl group; and m represents an integer of 1 or more.

2. A process as claimed in claim 1, wherein said pitch has an optical anisotropy of at least 95%, a softening point of from 210° to 250° C., and a toluene insoluble content of 50% by weight or less.

3. A process as claimed in claim 1, wherein said graphite fiber has an interlaminar distance ($d_{002}$) of 3.370 Å or less as determined by X-ray diffractometry and a specific resistivity of from 60 to 200 $\mu\Omega$cm.

4. A process as claimed in claim 1, wherein said compound of formula (I) is a polymer obtained by polymerizing 1,2,4-trimethylbenzene or 1,3,5-trimethylbenzene and formaldehyde in the presence of a protonic acid as a catalyst, said polymer having an oxygen content of not more than 2% by weight, and said graphite fiber having a interlaminar distance ($d_{002}$) of 3.370 Å or less as determined by X-ray diffractometry and a specific resistivity of from 60 to 200 $\mu\Omega$cm.

* * * * *